United States Patent [19]

Fendley et al.

[11] Patent Number: 4,739,217

[45] Date of Patent: Apr. 19, 1988

[54] A-SHAPED TENSION MASK MOUNTING RAIL

[75] Inventors: James R. Fendley, Arlington Heights; James L. Kraner, Barrington, both of Ill.

[73] Assignee: Zenith Electronics Corporation, Glenview, Ill.

[21] Appl. No.: 925,345

[22] Filed: Oct. 31, 1986

[51] Int. Cl.⁴ .......................... H01S 29/07

[52] U.S. Cl. .......................... 313/407; 313/408

[58] Field of Search .......................... 313/402, 407, 408

[56] References Cited

U.S. PATENT DOCUMENTS

| | | | |
|---|---|---|---|
| 2,625,734 | 1/1953 | Law | 29/25.13 |
| 2,733,366 | 1/1956 | Grimm et al. | 313/85 |
| 2,761,990 | 9/1956 | Amdursky et al. | 313/70 |
| 2,813,213 | 11/1957 | Cramer et al. | 313/78 |
| 2,842,696 | 7/1958 | Fischer-Colbrie | 313/78 |
| 2,905,845 | 9/1959 | Vincent | 313/78 |
| 3,030,536 | 4/1962 | Hackett et al. | 313/80 |
| 3,284,655 | 6/1963 | Oess | 313/286 |
| 3,638,063 | 1/1972 | Tachikawa et al. | 313/348 |
| 3,727,087 | 4/1973 | Steinberg | 313/91 |
| 3,894,321 | 7/1975 | Moore | 29/25.15 |
| 4,045,701 | 8/1977 | Dougherty | 313/408 |
| 4,069,567 | 1/1978 | Schwartz | 29/25.15 |
| 4,087,717 | 5/1978 | Lerner | 313/406 |
| 4,100,451 | 7/1978 | Palac | 313/404 |
| 4,547,696 | 10/1985 | Strauss | 313/407 |

OTHER PUBLICATIONS

"The CBS-Colortron: A Color Picture Tube of Advanced Design", N. F. Fyler, W. E. Rowe, C. W. Cain.
"A High-Brightness Shadow Mask Color CRT for Cockpit Displays", Robinder, Bates, Green, Lewen and Rath, Tektronix, Inc., Beaverton, Oreg.

*Primary Examiner*—David K. Moore
*Assistant Examiner*—Sandra L. O'Shea

[57] ABSTRACT

An improved front assembly for a color cathode ray tube having a tension foil shadow mask is disclosed. The faceplate of the tube has on its inner surface a centrally disposed phosphor screen surrounded by a peripheral sealing area adapted to mate with a funnel. A shadow mask support structure is provided for securing a shadow mask in tension on the structure and spacing the shadow mask from the screen. The support structure includes an upper, flattened ridge for securing the shadow mask to the support structure. A plurality of legs depend from the ridge and at least a series of the legs is flared outwardly from one side of the ridge to facilitate securing the support structure to the faceplate and to stabilize the support structure under the tension of the shadow mask.

25 Claims, 4 Drawing Sheets

A-SHAPED TENSION MASK MOUNTING RAIL

CROSS-REFERENCE TO RELATED APPLICATIONS

This application is related to but in no way dependent upon copending applications Ser. Nos. 832,493, filed Feb. 21, 1986; 831,699, filed Feb. 21, 1986; 832,556, filed Feb. 21, 1986; 835,845, filed Mar. 3, 1986; and 866,030, filed May 21, 1986, all of common ownership herewith.

FIELD OF THE INVENTION

This invention generally relates to color cathode ray picture tubes and, specifically, to a novel front assembly for color tubes that have a tension foil shadow mask. The invention is useful in color tubes of various types including those used in home entertainment television receivers, and those used in medium-resolution and high-resolution tubes intended for color monitors.

BACKGROUND OF THE INVENTION

The use of the tension foil mask and a flat faceplate provides many advantages and benefits in comparison with the conventional curved or domed shadow mask. Chief among these is a greater power-handling capability which makes possible as much as a three-fold increase in brightness. The conventional curved shadow mask, which is not under tension, tends to "dome" in high-brightness picture areas where the intensity of electron bombardment is greatest. Color impurities result as the mask moves closer to the faceplate. Being under high tension, the tension foil mask does not dome or otherwise move in relation to the faceplate. Therefore, it has greater brightness potential while maintaining color purity.

The tension foil shadow mask is a part of the cathode ray tube front assembly, and is located in close adjacency to the faceplate. The front assembly comprises the faceplate with its deposits of light-emitting phosphors, a shadow mask, and support means for the mask. As used herein, the term "shadow mask" means an apertured metallic foil which may have a thickness, by way of example, of about one mil or less. The mask must be supported in high tension a predetermined distance from the inner surface of the cathode ray tube faceplate. This distance is known as the "Q-distance." The high tension may be in the range of 20 to 40 kpsi. As is well known in the art, the shadow mask acts as a color-selection electrode, or parallax barrier, which ensures that each of the three color beams lands only on its assigned phosphor deposits.

The requirements for the support means for the shadow mask are stringent. As has been noted, the shadow mask must be mounted under high tension. The mask support means must be of high strength so that the mask is held immovable. An inward movement of the mask of as little as one-tenth of a mil is significant in that guard band may be expended. Also, the shadow mask support means must be of such configuration and material composition as to be compatible with the means to which it is attached. As an example, if the support means is attached to glass such as the inner surface of the faceplate, the support means must have about the same thermal coefficient of expansion as that of the glass. The support means must provide a suitable surface for mounting the mask. Also, the support means must be of a composition such that the mask can be welded onto it by electrical resistance welding or by laser welding. The support surface preferably is of such flatness that no voids can exist between the metal of the mask and the support structure to prevent the intimate metal-to-metal contact required for proper welding.

A tension mask registration and supporting system is disclosed by Strauss in U.S. Pat. No. 4,547,696 of common ownership herewith. A frame dimensioned to enclose the screen comprises first and second space-apart surfaces. A tensed foil shadow mask has a peripheral portion bonded to a second surface of the frame. The frame is registered with the faceplate by ball-and-groove indexing means. The shadow mask is sandwiched between the frame and a stabilizing or stiffening member. When the system is assembled, the frame is located between the sealing lands of the faceplate and a funnel, with the stiffening member projecting from the frame into the funnel. While the system is feasible and provides an effective means for holding a mask under high tension and rigidly planoparallel with a flat faceplate, weight is added to the cathode ray tube, and additional process steps are required in manufacture.

There exists in the marketplace today a color tube that utilizes a tensed shadow mask. The mask is understood to be placed under high tension by purely mechanical means. Specifically, a very heavy mask support frame is compressed prior to and during affixation of the mask to it. Upon release of the frame, restorative forces in the frame cause the mask to be placed under high residual tension. During normal tube operation, electron beam bombardment causes the mask to heat up and the mask tension to be reduced. An upper limit is placed on the intensity of the electron beams that may be used to bombard the screen without causing the mask to relax completely and lose its color selection capability. The upper limit has been found to be below that required to produce color pictures of the same brightness as are produced in tubes having non-tensed shadow masks. For descriptions of examples of this type of tube, see U.S. Pat. No. 3,683,063 to Tachikawa.

Other prior art include: Lerner—U.S. Pat. No. 4,087,717; Dougherty—U.S. Pat. No. 4,045,701; Palac—U.S. Pat. No. 4,100,451; Law—U.S. Pat. No. 2,625,734; Steinberg et al—U.S. Pat. No. 3,727,087; Schwartz—U.S. Pat. No. 4,069,567; Moore—U.S. Pat. No. 3,894,321; Oess—U.S. Pat. No. 3,284,655; Hackett—U.S. Pat. No. 3,303,536; Hackett et al—U.S. Pat. No. 3,030,536; Vincent—U.S. Pat. No. 2,905,845; Fischer-Colbrie—U.S. Pat. No. 2,842,696; Law—U.S. Pat. No. 2,625,734; a journal article: "The CBS Colortron: A color picture tube of advanced design." Fyler et al. Proc. of the IRE, Jan. 1954. Dec. class R583.6; and a digest article: "A High-Brightness Shadow-Mask Color CRT for Cockpit Displays." Robinder et al. Society for Information Display, 1983.

OBJECTS OF THE INVENTION

A general object of the invention is to provide an improved front assembly for tension foil shadow mask tubes.

Another general object of the invention is to provide a tension foil shadow mask support structure that is low in cost and light in weight.

A further object of the invention is to provide a tension foil shadow mask support structure that can be mounted on a faceplate for receiving a tension foil shadow mask.

Still another object of the invention is to provide a tension foil shadow mask support structure that is capable of holding a tension foil shadow mask firmly in registration under high electron beam bombardment.

Yet a further object of the invention is to provide a tension foil shadow mask support structure that simplifies manufacture and lowers manufacturing costs.

BRIEF DESCRIPTION OF THE DRAWINGS

The features of the present invention which are believed to be novel are set forth with particularity in the appended claims. The invention, together with further objects and advantages thereof, may best be understood by reference to the following description taken in conjunction with the accompanying drawings, in the figures of which like reference numerals identify like elements, and in which:

DESCRIPTION OF THE PREFERRED EMBODIMENT

Figure 1:
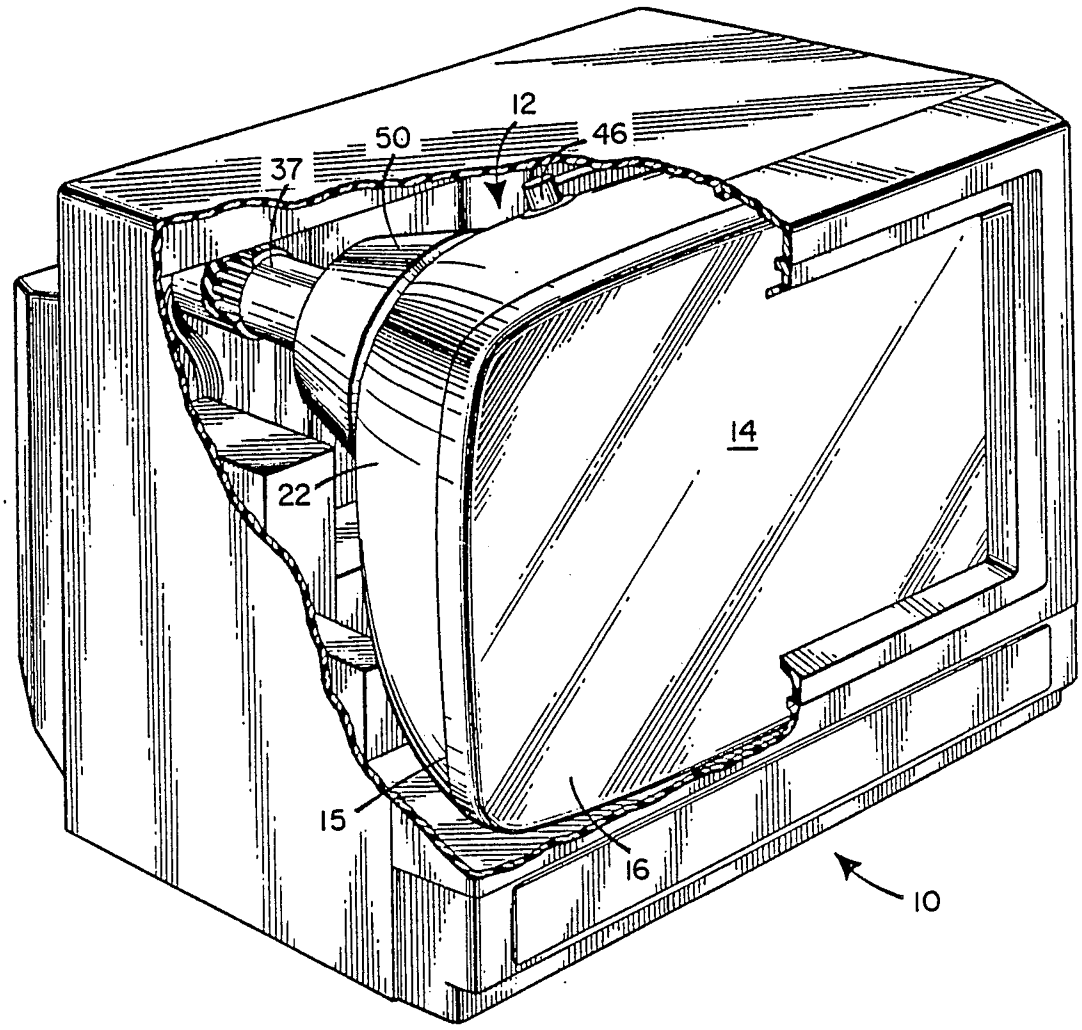
FIG. 1 is a cut-away perspective view of a cabinet housing a cathode ray tube having a front assembly according to the invention.

FIG. 1 depicts a video monitor, generally designated 10, that houses a color cathode ray tube, generally designated 12, having a novel front assembly according to the invention. The design of the video montior is the subject of copending design patent application Ser. No. 725,040 of common ownership herewith. The monitor-associated tube is notable for the flat imaging area 14 that makes possible the display of images in undistorted form. Imaging area 14 also offers a more efficient use of screen area as the corners are relatively square in comparison with the more rounded corners of the conventional cathode ray tube. The front assembly according to the invention comprises the components described in the following paragraphs.

Figure 2:
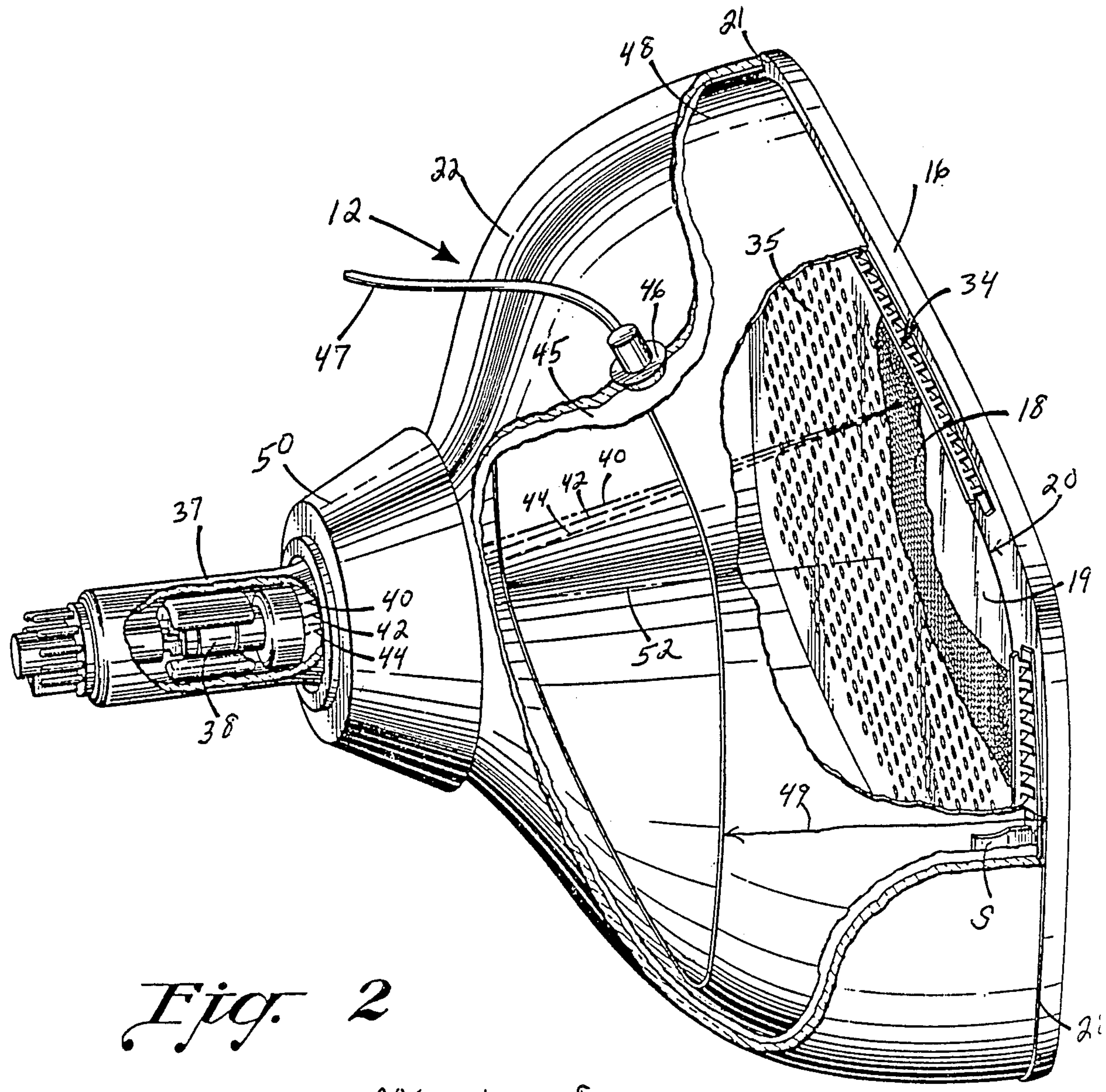
FIG. 2 is a cut-away side perspective view of the color cathode ray tube of FIG. 1, illustrating the location of a shadow mask support structure incorporating the concepts of the invention.
Figure 3:
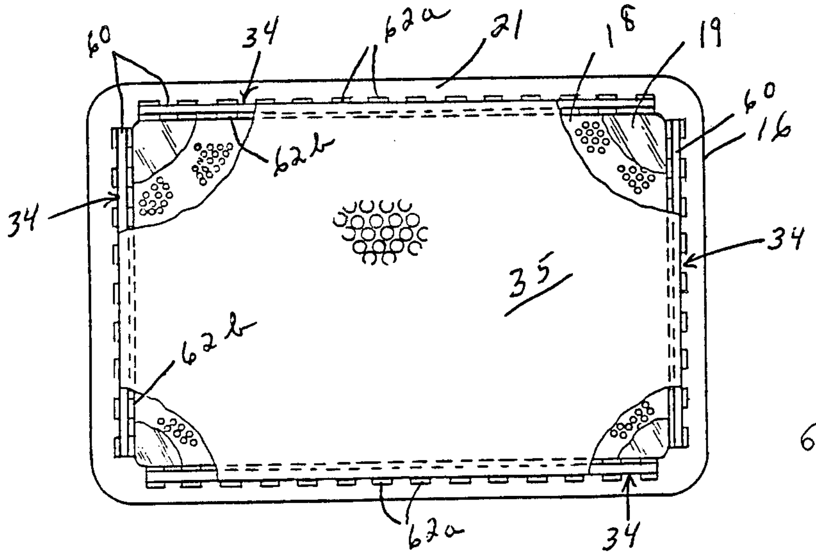
FIG. 3 is a plan view showing the relationship of the shadow mask support structure to the inner surface of the cathode ray tube faceplate shown in FIG. 2.
Figure 4:
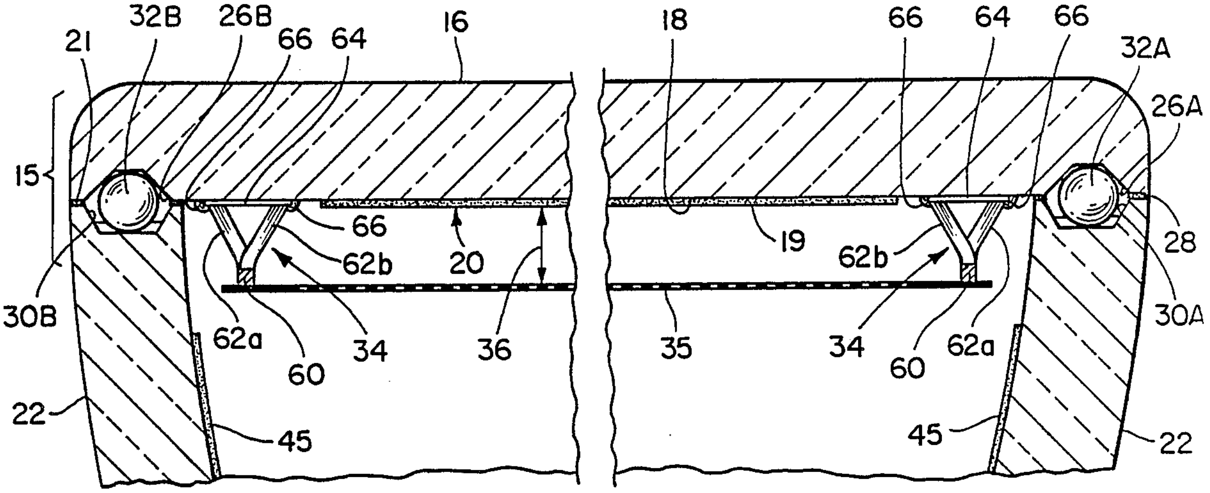
FIG. 4 is a broken section, on an enlarged scale, taken through the front assembly generally on the axis of the cathode ray tube.

With reference also to FIGS. 2, 3 and 4, a front assembly 15 (FIG. 4) for a high-resolution color cathode ray tube is depicted, the general scope of which is indicated by the bracket. Front assembly 15 includes a glass faceplate 16 noted as being flat, or alternately, "substantially" flat in that it may have finite horizontal and vertical radii. Faceplate 16, depicted in this embodiment of the invention as being planar and flangeless, has on its inner surface a centrally disposed phosphor target area 18, on which is deposited an electrically conductive film 19. Phosphor target area 18 and conductive film 19 comprise the electron beam target area, commonly termed a "screen," generally designated 20, which serves, during manufacture, for receiving a uniform coat of phosphor slurry. Conductive film 19, which is deposited on the phosphor deposits in a final step, typically consists of a very thin, light-reflective, electron-pervious film of aluminum.

Screen 20 is surrounded by a peripheral sealing area 21 adapted to be mated with a funnel 22. Sealing area 21 is represented as having three substantially radially oriented first indexing V-grooves therein, only two grooves 26A and 26B being shown in FIG. 4. The indexing grooves preferably are peripherally located at equal angular intervals about the center of faceplate 16; that is, at 120-degree intervals. Indexing grooves 26A and 26B are shown in FIG. 4. The third indexing groove is not shown; however, it is also located in peripheral sealing area 21 equidistantly from indexing elements 26A and 26B. The V-shaped indexing grooves provide for indexing faceplate 16 in conjunction with a mating envelope member, as will be shown.

Funnel 22 has a funnel sealing area 28 with second indexing elements or grooves 30A and 30B therein in like orientation, and depicted in FIG. 4 in facing adjacency with the first indexing elements 26A and 26B. Ball means 32A and 32B, which provide complementary rounded indexing means, are conjugate with the indexing grooves or elements 26A and 26B and 30A and 30B for registering the faceplate 16 and the funnel 22. The first indexing elements together with the ball means are also utilized as indexing means during the photoscreening of the phosphor deposits on the faceplate.

Front assembly 15 according to the invention includes a tension foil mask support structure, generally designated 34, secured to the inner surface of faceplate 16 between screen 20 and peripheral sealing area 21 and enclosing the phosphor target 18. The support structure provides for supporting a tension foil shadow mask 35 a predetermined "Q-distance" from the inner surface of faceplate 16. The predetermined distance may comprise the "Q-distance" 36, as indicated by the associated arrow in FIG. 4. The mask, indicated as being planar, is depicted as being stretched in all directions in the plane of the mask.

As seen in FIG. 2, a neck 37 extending from funnel 22 is represented as housing an electron gun 38 which is indicated as emitting three electron beams 40, 42 and 44 that selectively activate phosphor target 18, noted as comprising colored-light emitting phosphor deposits overlayed with a conductive film 19. Beams 40, 42 and 44 serve to selectively activate the pattern of phosphor deposits after passing through the parallax barrier formed by shadow mask 35.

Funnel 22 is indicated as having an internal electrically conductive funnel coating 45 adapted to receive a high electrical potential. The potential is depicted as being applied through an anode button 46 attached to a conductor 47 which conducts a high electrical potential to the anode button 46 through the wall of funnel 22. The source of the potential is a high-voltage power supply (not shown). The potential may be, for example, in the range of 18 to 26 kilovolts in the illustrated monitor application. Means for providing an electrical connection between the electrically conductive support structure 34 and funnel coating 45 may comprise spring means "S" (depicted in FIG. 2).

A magnetically permeable internal magnetic shield 48 is shown as being attached to support structure 34. Shield 48 extends into funnel 22 a predetermined distance 49 which is calculated so that there is no interference with the excursion of the electron beams 40, 42 and 44, yet maximum shielding is provided.

A yoke 50 is shown as encircling tube 12 in the region of the junction between funnel 22 and neck 37. Yoke 50 provides for the electromagnetic scanning of beams 40, 42 and 44 across the screen 20. The center axis 52 of tube 12 is indicated by the broken line.

Figure 5:
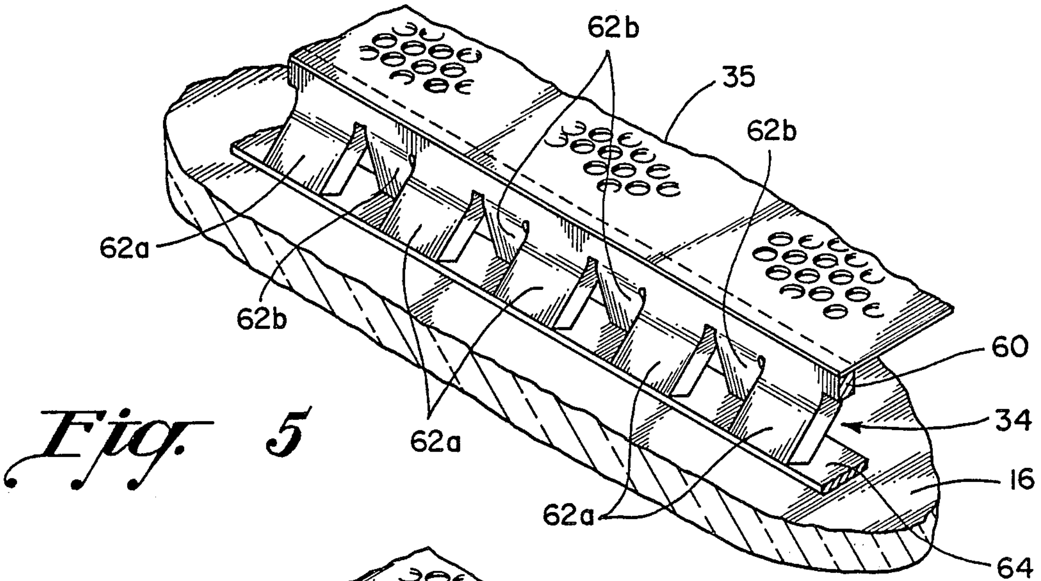
FIG. 5 is a fragmented perspective view illustrating one embodiment of the shadow mask support structure of the invention.
Figure 6:
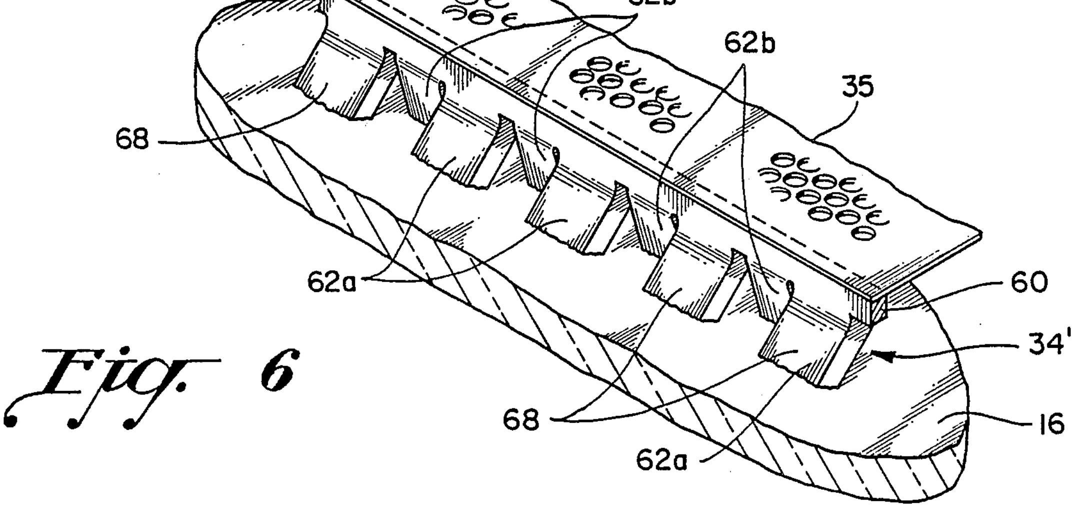
FIG. 6 is a fragmented perspective view of another embodiment of the shadow mask support structure.

Referring to FIGS. 5 and 6 in conjunction with the previously described figures, particularly FIG. 4, the shadow mask support structure 34 of this invention is formed from a strip of conductive metal so as to provide an upper planar portion of ridge 60 for securing shadow mask 35 to the support structure. A plurality of legs *62a* and *62b* depend from the ridge to facilitate securing the support structure to faceplate 16. The top of ridge 60 is flattened as seen in FIG. 4, and legs *62a* and *62b* flare outwardly from both sides of the ridge to stabilize the support structure under the tension forces of the shadow mask. It can be seen that the legs flare outwardly from the ridge in an alternating array on opposite sides thereof, whereby legs *62a* flare in a direction away from the center axis of the tube, and legs *62b* flare inwardly toward the center axis of the tube.

Two embodiments of support structure 34 are shown in FIGS. 5 and 6 and differ only in the manner in which the support structure is secured to the faceplate 16. More particularly, FIGS. 4 and 5 show an elongated plate or strip 64 of metal which is secured to the distal ends of legs *62a, 62b*. This plate of strip, in turn, is secured to faceplate 16 by hardened cement 66 (FIG. 4). The metal strip may be secured to the inner surface of faceplate 16, for example, by a devitrifying glass frit well-known in the art, or by a cold setting cement such as a Sauereisen-type cement.

Legs *62a* and *62b* of metal support structure 34 may be secured to plate 64 by welding. Tension foil shadow mask 35, in turn, is welded onto the flattened top surface of ridge 60 of support structure 34.

The metal material of plate 64 and/or support structure 34 preferably comprises a "Carpenter 27" chrome-iron alloy manufactured by Carpenter Technology Inc., Reading, Pa., a metal that has a coefficient of expansion that substantially matches that of the glass of faceplate 16.

FIG. 6 shows an alternative wherein the distal ends of legs *62a* and *62b* are partially embedded into the glass of faceplate 16, as at 68, when the glass is elevated to a temperature between its strain point and its annealing point. This alternative is generally designated 34' and also includes flattened ridge 60 for supporting welded-on tension foil shadow mask 35. A process for embedding the legs into the glass is disclosed in copending application Ser. No. 925,424, filed Oct. 31, 1986, of common ownership herewith, and which is incorporated herein by reference.

Tension foil shadow mask support structure 34 (or 34') may be provided continuous (unbroken) about the centrally disposed phosphor screen 20. On the other hand, since the support structure is simply fabricated of two (FIG. 5) or one (FIG. 6) strips of metallic material, the support structure may be disposed along four linear sides of the screen as shown in FIG. 3.

Figure 7:
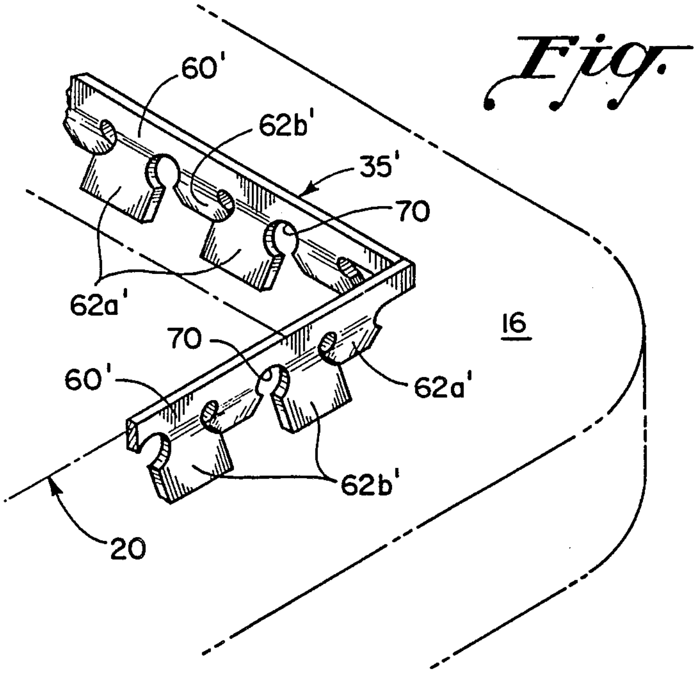
FIG. 7 is a fragmented perspective view of a further embodiment of the shadow mask support structure.
Figure 8:
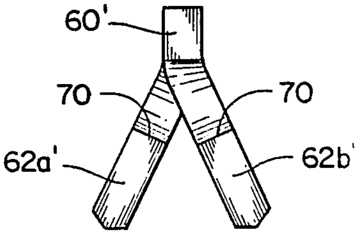
FIG. 8 is an end view of the support structure of FIG. 7.
Figure 9:
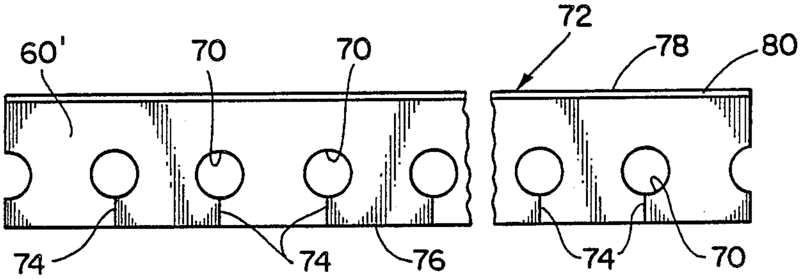
FIG. 9 is a plan view of a blank from which the support structure of FIGS. 7 and 8 is stamped and formed.
Figure 10:
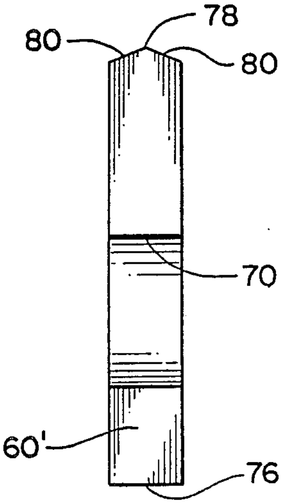
FIG. 10 is an end view of the blank of FIG. 9.

FIGS. 7 and 8 show an alternate form of the invention which permits shear forming of the legs from a strip blank shown in FIGS. 9 and 10. As with the embodiments of FIGS. 5 and 6, an upper planar portion or ridge 60' provides means for securing the shadow mask to the support structure 35'. A series of legs *62a'* flare outwardly from one side of planar portion 60', and a series of legs *62b'* flare outwardly from the opposite side of the planar portion, in an alternating array. In this embodiment, an aperture 70 is stamped through the metal strip at the root area between adjacent legs to facilitate forming the legs by shear forming procedures as well as to permit cleaning or "trimming" of unwanted materials deposited during the screening process.

More particularly, FIGS. 9 and 10 show a blank strip, generally designated 72, from which support structure 35' (FIGS. 7 and 8) is formed. Apertures 70 first are stamped in a linear array longitudinally of the strip parallel to its side edges. The blank then is sheared, as at 74, between apertures 70 and edge 76 of the strip, and the legs then are easily formed. As seen best in FIG. 10, the opposite edge 78 is bevelled, as at 80, so that when the legs are bent out of the plane of upper planar portion 60', the edge of each leg will be parallel to the surface of faceplate 16 for securing thereto.

Figure 11:
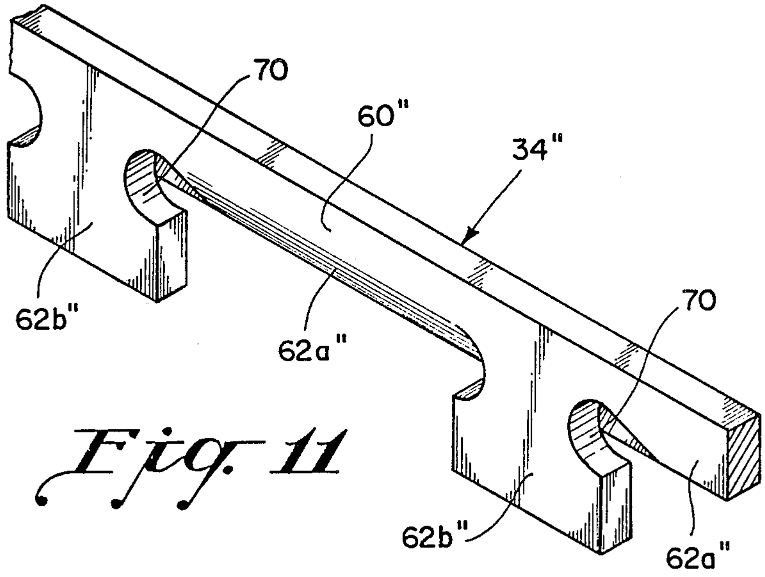
FIG. 11 is a fragmented perspective view of still another embodiment of the shadow mask support structure.
Figure 12:
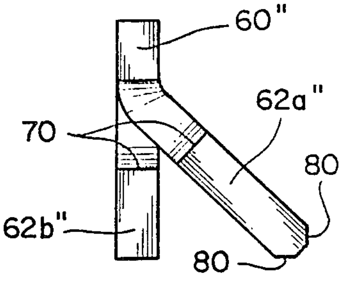
FIG. 12 is an end view of the support structure of FIG. 10.

FIGS. 11 and 12 show still a further embodiment of the invention incorporated in a shadow mask support structure, generally designated 34". This embodiment is similar to that of FIGS. 7-10, except that it can be seen that legs *62b"* are shorter than legs *62a"* and are disposed in the plane of upper planar portion 60", while alternate legs *62a"* flare or angle outwardly of the planar portion, either inwardly toward screen 20 or outwardly from screen 20. This embodiment still provides a broadened stance for the support structure and planar portion 60".

While particular embodiments of the invention have been shown and described, it will be readily apparent to those skilled in the art that changes and modifications may be made in the inventive means and method without departing from the invention in its broader aspects, and therefore, the aim of the appended claims is to cover all such changes and modifications as fall within the true spirit and scope of the invention.

What is claimed is:

1. A front assembly for a color cathode ray tube including a faceplate having on its inner surface a centrally disposed phosphor screen surrounded by a peripheral area adapted to mate with a funnel, said assembly including a shadow mask support structure for securing a shadow mask in tension upon said faceplate inner surface and for spacing the shadow mask from the screen, said support structure comprising an upper ridge for securing the shadow mask to said support structure, and a series of legs flaring outwardly from each side of said ridge in opposed directions to stabilize said support structure and to facilitate securing said support structure to the faceplate.

2. The front assembly of claim 1 wherein the top of said ridge is flattened.

3. The front assembly of claim 1 wherein said legs flare outwardly from the ridge in an alternating array on opposite sides thereof.

4. The front assembly of claim 1 wherein said support structure is fabricated of a strip of formed metal.

5. The front assembly of claim 4 wherein the shadow mask is secured to the ridge of the metal strip by weld means.

6. The front assembly of claim 5 wherein the top of said ridge is flattened.

7. The front assembly of claim 1 wherein the faceplate is fabricated of glass, and said support structure is secured to the faceplate by embedding the distal ends of the legs partially into the glass when the glass is at a temperature in the range between its strain point and its annealing point.

8. The front assembly of claim 1 wherein the distal ends of said legs are secured to flat plate means and the flat plate means, in turn, is secured to the faceplate.

9. The front assembly of claim 8 wherein said flat plate means is secured to the faceplate by a hardened cement.

10. The front assembly of claim 1 wherein said support structure substantially surrounds the centrally disposed phosphor screen.

11. A front assembly for a color cathode ray tube including a faceplate having on its inner surface a centrally disposed phosphor screen surrounded by a peripheral area adapted to mate with a funnel, said assembly including a shadow mask support structure for securing a shadow mask in tension upon said faceplate inner surface and for spacing the shadow mask from the screen said support structure comprising a support member having an upper ridge, the top of which is flattened for securing the shadow mask to said support structure, and a plurality of legs depending from said ridge and flared outwardly therefrom in an alternating array on opposite sides thereof to facilitate securing said support structure to the faceplate with the outwardly flared legs stabilizing said support structure under the tension forces of the shadow mask.

12. The front assembly of claim 11 wherein said support structure is fabricated of a strip of formed metal.

13. The front assembly of claim 12 wherein the shadow mask is secured to the flattened top of the ridge by weld means.

14. The front assembly of claim 11 wherein the faceplate is fabricated of glass, and said support structure is secured to the faceplate by embedding the distal ends of the legs partially into the glass when the glass is at a temperature in the range between the strain point and its annealing point.

15. The front assembly of claim 11 wherein the distal ends of said legs are secured to flat plate means and the flat plate means, in turn, is secured to the faceplate.

16. The front assembly of claim 11 wherein said flat plate means is secured to the faceplate by a hardened cement.

17. The front assembly of claim 11 wherein said support structure substantially surrounds the centrally disposed phosphor screen.

18. A front assembly for a color cathode ray tube including a faceplate having on its inner surface a centrally disposed phosphor screen, said assembly including a shadow mask support structure for securing a shadow mask in tension upon said faceplate inner surface and for spacing the shadow mask from the screen, said support structure comprising an upper portion for securing the shadow mask to said structure, and a series of legs flared outwardly from each side of the upper portion in opposed directions to stabilize the support structure.

19. The front assembly of claim 18 wherein said legs flare outwardly from said upper portion in an alternating array on opposite sides thereof.

20. The front assembly of claim 18 wherein the top of said upper portion is flattened.

21. A front assembly for a color cathode ray tube including a faceplate having on its inner surface a centrally disposed phosphor screen, said assembly including a shadow mask support structure for securing a shadow mask in tension upon said faceplate inner surface and for spacing the shadow mask from the screen, said support structure comprising an upper planar portion for securing the shadow mask to said support structure, and a series of legs depending from the upper planar portion and angled relative to each other in an alternating array to provide a broadened stance for the planar portion and stabilize said support structure under the tension forces of the shadow mask.

22. The front assembly of claim 21 wherein said legs angle outwardly from said upper planar portion in an alternating array on opposite sides thereof.

23. The front assembly of claim 21 wherein alternate ones of said legs are disposed in the plane of said upper portion and the remaining legs are angled outwardly from the upper planar portion.

24. The front assembly of claim 23 wherein said remaining legs angle toward the screen.

25. The front assembly of claim 21 wherein said support structure is stamped and formed from a generally planar striplike blank.

* * * * *